(12) United States Patent
Patel et al.

(10) Patent No.: US 8,772,403 B2
(45) Date of Patent: Jul. 8, 2014

(54) FOOD GRADE MARKER

(75) Inventors: Naresh B. Patel, Bridgewater, NJ (US); William J. Zumdome, Bettendorf, IA (US); John P. Keating, Overland Park, KS (US)

(73) Assignee: Illinois Tool Works Inc., Glenview, IL (US)

( * ) Notice: Subject to any disclaimer, the term of this patent is extended or adjusted under 35 U.S.C. 154(b) by 357 days.

(21) Appl. No.: 12/649,085

(22) Filed: Dec. 29, 2009

(65) Prior Publication Data

US 2010/0221440 A1 Sep. 2, 2010

Related U.S. Application Data

(60) Provisional application No. 61/208,776, filed on Feb. 27, 2009, provisional application No. 61/220,021, filed on Jun. 24, 2009.

(51) Int. Cl.
*C08L 31/02* (2006.01)
(52) U.S. Cl.
USPC ............ 524/563; 524/556; 118/13; 118/200; 118/268; 118/264; 427/385.5
(58) Field of Classification Search
USPC .............. 427/385.5; 118/13, 200, 268, 264; 426/652
See application file for complete search history.

(56) References Cited

U.S. PATENT DOCUMENTS

| 4,685,820 A | 8/1987 | Kremer et al. |
| 4,792,252 A | 12/1988 | Kremer et al. |
| 4,848,947 A | 7/1989 | Kremer et al. |
| 5,397,387 A | 3/1995 | Deng et al. |
| 6,025,022 A | 2/2000 | Matzinger |
| 6,641,320 B1 | 11/2003 | Ballot et al. |
| 2003/0051634 A1 | 3/2003 | Takahashi |

FOREIGN PATENT DOCUMENTS

| EP | 0 899 309 A1 | 3/1999 |
| WO | WO 2005/003242 A2 | 1/2005 |
| WO | WO 2005/035673 A1 | 4/2005 |
| WO | WO 2005/082611 A1 | 9/2005 |
| WO | WO 2006/120227 A1 | 11/2006 |

OTHER PUBLICATIONS

Wacker Polymers "VINNOL Surface Coating Resins Vinyl Chloride Copolymers and Terpolymers" availabe online at least as early as Dec. 6, 2008.*
Internet Archive WayBack machine result for Wacker Polymer reference which is available at the website http://www.wacker.com/cms/media/publications/downloads/5568_EN.pdf.*

* cited by examiner

*Primary Examiner* — Robert S Walters, Jr.
(74) *Attorney, Agent, or Firm* — Pauley Petersen & Erickson

(57) ABSTRACT

A food-grade marking composition useful for marking and labeling surfaces of food processing equipment includes a food grade base polymer, a coloring agent, and a volatile organic solvent. A marker pen is also provided which includes the food grade marking composition in combination with a delivery instrument. The food grade base polymer meets the regulatory requirements of 21 C.F.R. §175.300 for incidental food contact applications.

14 Claims, 1 Drawing Sheet

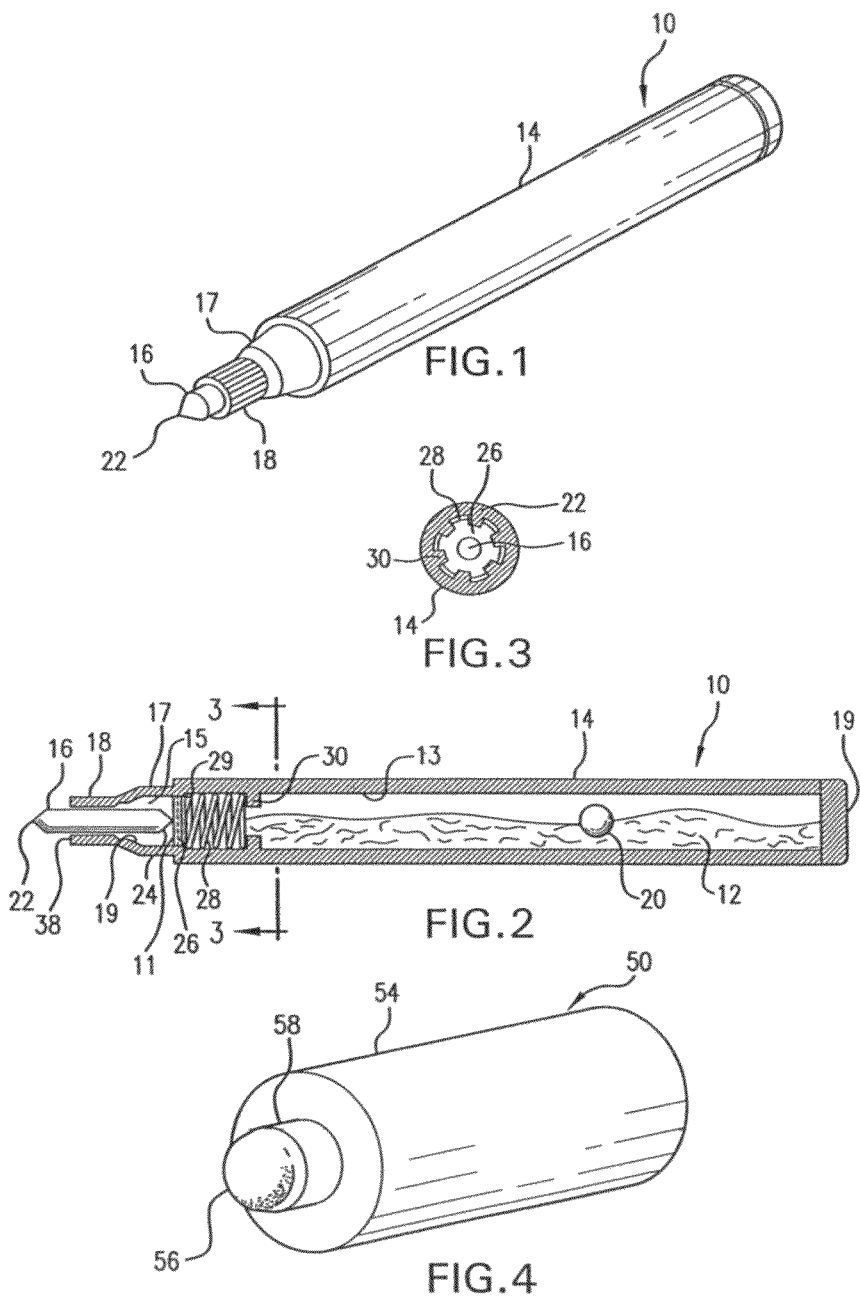

FOOD GRADE MARKER

RELATED APPLICATIONS

This patent application claims priority under 35 U.S.C. §119(e)(1) based on U.S. Provisional Application Ser. No. 61/208,776, filed on 27 Feb. 2009, and U.S. Provisional Application Ser. No. 61/220,021, filed on 24 Jun. 2009, the disclosures of which are incorporated by reference.

FIELD OF THE INVENTION

This invention relates to a food grade marking composition which is safe for incidental food contact, and to a marker pen for applying the food grade marking composition.

BACKGROUND OF THE INVENTION

Various techniques have been used for marking and labeling process equipment used to process meat, poultry, fish, dairy products, produce, juices, and other food products. In designing such labels, two significant challenges must be met. First, the label must be designed so that the marking is permanent and does not wear off during processing of the food items. Second, conventional labeling inks are not designed or approved for contact with foods. Therefore, the equipment and labeling should be designed so that the food products are generally protected from exposure to conventional labeling inks.

Isolation of food products from labeling inks is especially challenging when the food product is wet, flexible and moving, such as during the processing of meat and poultry. Accordingly, there is a need or desire for a marking composition which is durable, safe and approved for indirect and incidental contact with food products. There is also a need or desire for a marker pen or instrument that is capable of applying the marking composition to a wide variety of food processing equipment made of plastic, metal, glass, and the like.

SUMMARY OF THE INVENTION

The present invention is directed to a food grade marking composition which is safe for incidental food contact, and whose dry ingredients suitably meet the certification requirements of the NSF International/Nonfood Compounds Registration Program. The NSF International/Nonfood Compounds Registration Program is a continuation of the U.S.D.A. product approval and listing program, which is based on meeting the Food and Drug Administration regulatory requirements described in 21 C.F.R. §175.300. The marking composition of the invention includes a food grade based polymer, which can be a terpolymer of vinyl chloride, vinyl acetate and dicarboxylic acid; a volatile organic solvent; and a coloring agent.

The present invention is also directed to a marker pen which includes the food grade marking composition combined with a delivery instrument, and a method for making a food grade label. The marker pen can apply the food grade marking composition to a variety of surfaces made of plastic, metal, glass, and the like. The marking composition provides durable marking labels for food processing equipment used to process meat, poultry, fish, dairy products, produce, juices and other food products. The marking labels are not spontaneously removed when exposed to wet, flexible and/or moving food products.

The present invention overcomes disadvantages associated with conventional marking compositions that are not food grade and are not NSF-approved. By applying a food grade marking composition, any concerns associated with incidental contact between the marking labels and food products can be alleviated.

BRIEF DESCRIPTION OF THE DRAWINGS

FIG. 1 is a perspective view of one embodiment of a marker pen useful for applying the food grade marking composition of the invention.

FIG. 2 is an enlarged side sectional view of the marker pen of FIG. 1.

FIG. 3 is a front view of the marker pen taken along line 3-3 in FIG. 2.

FIG. 4 is a perspective view of another embodiment of a marker pen useful for applying the food grade marking composition of the invention.

DETAILED DESCRIPTION OF THE INVENTION

The food grade marking composition of the invention includes, in combination, a base polymer, a coloring agent, and one or more volatile solvents. The marking composition is formulated so that the dry ingredients which remain after evaporation of the solvent satisfy the regulatory requirements of 21 C.F.R. §175.300.

The food grade base polymer is defined as one which meets the regulatory requirements of 21 C.F.R. §175.300. One suitable food grade base polymer is a terpolymer of predominantly vinyl chloride with vinyl acetate and dicarboxylic acid, available from Wacker Polymers of Adrian, Mich. under the trade name VINNOL® H15/45M. Based on information from the supplier, this terpolymer has excellent resistance to water, oil, grease, aliphatic hydrocarbons, alcohols, dilute aqueous acids, alkalis, and saline solutions. The terpolymer may be present in the marking composition in an amount of about 1-20% by weight, suitably about 1.5-10% by weight, or about 2-5% by weight.

The coloring agent may also contain food grade ingredients that meet the regulatory requirements of 21 C.F.R. §175.300. The type of coloring agent depends on the desired color of the marking composition. When a black marking composition is desired, the coloring agent may be a combination of a black pigment, such as carbon black, and a food grade carrier resin. One food grade carrier resin is UCAR Solution Vinyl Resin VAGD available from Dow Chemical Co. of Midland, Mich. Another food grade carrier resin is VINNOL® H15/45M vinyl chloride terpolymer available from Wacker Polymers. For instance, the black coloring agent may contain about 25-35% by weight carbon black and about 65-75% by weight of the foregoing vinyl polymer. Other coloring agents and colors can also be used, provided the ingredients meet the requirements of 21 C.F.R. 175.300. The coloring agent may be present in the marking composition at about 2-20% by weight, suitably about 5-15% by weight, or about 8-12% by weight.

The volatile organic solvent should be composed of one or more ingredients that evaporate quickly following application of the marking composition to a substrate. Because the solvent is not approved for food contact, it should evaporate completely from the substrate. Ketone solvents having high volatility are especially suitable. One suitable solvent is a combination of about 50-85% by weight acetone and about 15-50% by weight cyclohexanone, particularly about 70-80% by weight acetone and about 20-30% by weight cyclohexanone. Another suitable solvent is a combination of about 50-85% by weight methyl isobutyl ketone and about 15-50% by weight cyclohexanone, particularly about 70-80% by weight methyl isobutyl ketone and about 20-30% by weight cyclohexanone. The second combination is more suitable because it does not evaporate quite as fast as the first combination. It is advantageous for the solvent to dry quickly, but not too quickly after the marking composition is applied to a substrate. The solvent may be present in the marking composition at about 60-97% by weight, suitably about 75-95% by weight, or about 83-90% by weight.

The present invention is also directed to a marker pen which includes the food grade marking composition in combination with a delivery instrument. Suitable marker pens include valve action marker pens. Exemplary valve action marker pens include those in which pressure applied to the pen dispensing tip during writing activates a spring-loaded valve inside the pen chamber, causing the release of marking composition from the chamber into the dispensing tip. Exemplary valve action marker pens are disclosed in U.S. Pat. No. 6,641,320, issued to Ballot et al.; U.S. Pat. No. 4,848,947, issued to Kremer et al.; U.S. Pat. No. 4,792,252, issued to Kremer et al.; and U.S. Pat. No. 4,685,820, issued to Kremer et al.

A particularly suitable valve action marker pen is illustrated in FIGS. 1-3 with an alternative valve action marker pen being shown in FIG. 4. Referring to FIGS. 1-3, a marker pen 10 contains a liquid marking composition 12 in a chamber 14, which has a narrower open end 18 and a wider closed end 19. A marker tip 16 is mounted to a narrow end 18 of marker pen 10, and is used for dispensing marking composition 12 onto a surface, typically by writing or brushing. The marker tip 16 may be formed of any suitable absorbent sponge, fibrous, felt or brush-type material. The chamber 14 may be provided with a metal ball or slug 20, used to agitate the marking composition 12 inside the chamber 14. A valve assembly 11 dispenses marking composition 12 from chamber 14 to marker tip 16.

The valve assembly 11 includes a plug 26, a subchamber 15, and a spring 28 mounted between one or more support members 30 and plug 26, as herein explained. The marker tip 16 has an exposed outer end 22 and an inner end 24 that engages cylindrical plug 26. The marker pen 10 has an intermediate portion 17 that is wider than narrow end 18 and narrower than chamber 14. The intermediate portion 17 acts as a transition between narrow end 18 and the wider chamber 14. When marker pen 10 is at ease, and not in use, the plug 26 engages inner wall 19 of intermediate portion 17, and the plug 26 and marker tip 16 define a subchamber 15 with the inner wall 19 of intermediate portion 17.

The plug 26 engages a spring 28 located in the wider chamber 14 immediately adjacent to the intermediate portion 17. The spring 28 is supported in chamber 14 between an end rim 29 and a plurality of support members 30 projecting from an inner wall 13 of chamber 14. When the marking pen 10 is used, the marker tip 16 is pressed against a substrate surface with sufficient pressure to dislodge plug 26 from the intermediate portion 17, and urge the plug 26 into the wider chamber 14 against the biasing action of spring 28. This opens the plug 26 and enables the food grade marker composition 12 to flow around the plug 26 and spill into subchamber 15, where it is absorbed by marker tip 16 and transmitted to the substrate surface. When the marking pen 10 is lifted from the substrate surface, the pressure is released, and the biasing action of spring 28 urges the plug 26 back into its closed position in the intermediate portion 17.

FIG. 4 illustrates an alternative valve action marker pen 50 in the form of a felt-tipped dauber applicator. The valve action marker pen 50 has a relatively wider chamber 54, and relatively wider narrow end 58 and marker tip 56, compared to the embodiment of FIGS. 1-3. The inner mechanics of the marker pen 50 may be the same or somewhat different than the inner mechanics of marker pen 10 of FIGS. 1-3. In any case, it has been determined that the food grade marking composition is best applied using a marker pen that is a valve action marker pen. In either embodiment, the narrow portion 18 of marker pen 10, or the narrow portion 58 of marker pen 50, may be covered with a removable (not shown) which protects the marker tip 16 or 56 when the marker pen is not in use.

The present invention is also directed to a method of making a food grade label for food processing equipment. The method includes the step of providing a marker pen as described above, including a chamber, a food grade marking composition in the chamber, a marker tip, and a valve assembly for transferring the food grade marking composition from the chamber to the marker tip. The tip of the marker pen is applied to a surface of the food processing equipment with sufficient pressure to activate the valve assembly to transfer a quantity of the food grade marking composition from the chamber to the tip. The marker tip is then moved along the surface of the food processing equipment to form the label. Once formed, the label is dried to remove the volatile organic solvent from the food grade marking composition. The remaining ingredients, namely the base polymer and the coloring agent, suitably meet the regulatory requirements of 21 C.F.R. §175.300 and are suitable for incidental food contact.

The embodiments of the invention described herein are exemplary, and various modifications and improvements can be made without departing from the spirit and scope of the invention. The scope of the invention is indicated by the appended claims, and all changes that fall within the meaning and range of equivalents are intended to be embraced therein.

We claim:

1. A food grade marking composition, consisting essentially of:
   about 1-20% by weight food grade base polymer;
   about 2-20% by weight of a coloring agent; and
   about 60-97% by weight of a volatile organic solvent;
   wherein the food grade base polymer is a terpolymer of vinyl chloride, vinyl acetate and dicarboxylic acid and the solvent comprises a mixture selected from the group consisting of a) about 50-85% by weight acetone and about 15-50% by weight cyclohexanone and b) about 50-85% by weight methyl isobutyl ketone and about 15-50% by weight cyclohexanone, and
   the food grade marking composition is adapted for use with a marker pen.

2. The food grade marking composition of claim 1, wherein the food grade base polymer is present at about 1.5-10% by weight.

3. The food grade marking composition of claim 1, wherein the coloring agent comprises a pigment and a food grade carrier resin.

4. The food grade marking composition of claim 1, wherein the coloring agent is present at about 5-15% by weight.

5. The food grade marking composition of claim 1, wherein the volatile organic solvent comprises acetone and cyclohexanone.

6. The food grade marking composition of claim 1, wherein the volatile organic solvent comprises methyl isobutyl ketone and cyclohexanone.

7. The rood grade marking composition of claim 1, wherein the volatile organic solvent is present at about 75-95% by weight.

8. A marker pen comprising the food grade marking composition of claim 1 in combination with a delivery instrument.

9. A marker pen, comprising:
a chamber containing a food grade marking composition; and
a marker tip receiving the food grade marking composition from the chamber;
wherein the marking composition consists essentially or about 1-20% by weight food grade base polymer, about 2-20% by weight of a coloring agent, and about 60-97% by weight of a volatile organic solvent; the food grade base polymer is a terpolymer of vinyl chloride, vinyl acetate and dicarboxylic acid; and the solvent comprises a mixture selected from the group consisting of a) about 50-85% by weight acetone and about 15-50% by weight cyclohexanone and b) about 50-85% by weight methyl isobutyl ketone and about 15-50% by weight cyclohexanone.

10. The marker pen of claim 9, further comprising a valve assembly for transferring the food grade marking composition from the chamber to the marker tip.

11. The marker pen of claim 10, wherein the valve assembly comprises:
a plug engaging an inner end of the marker tip;
a subchamber defined by the plug, a portion of the marker tip, and an inner wall portion of the marker pen;
a spring engaging the plug on a side opposite the marker tip; and
one or more support members engaging the spring and sustaining the spring between the plug and the one or more support members;
wherein pressure applied to the marker tip opens the plug and permits the food grade marker composition to flow from the chamber to the subchamber and into the marker tip.

12. The marker pen of claim 9, wherein the marker pen is configured as a dauber applicator.

13. The marker pen of claim 9, wherein the marker tip comprises a material selected from the group consisting of an absorbent sponge material, a fibrous material, a felt material, a brush-type material, and combinations thereof.

14. The marker pen of claim 9, wherein the food grade marking composition comprises about 1.5-10% by weight of the food grade base polymer, about 5-15% by weight of the coloring agent, and about 75-95% by weight of the volatile organic solvent.

* * * * *